Figure 1:
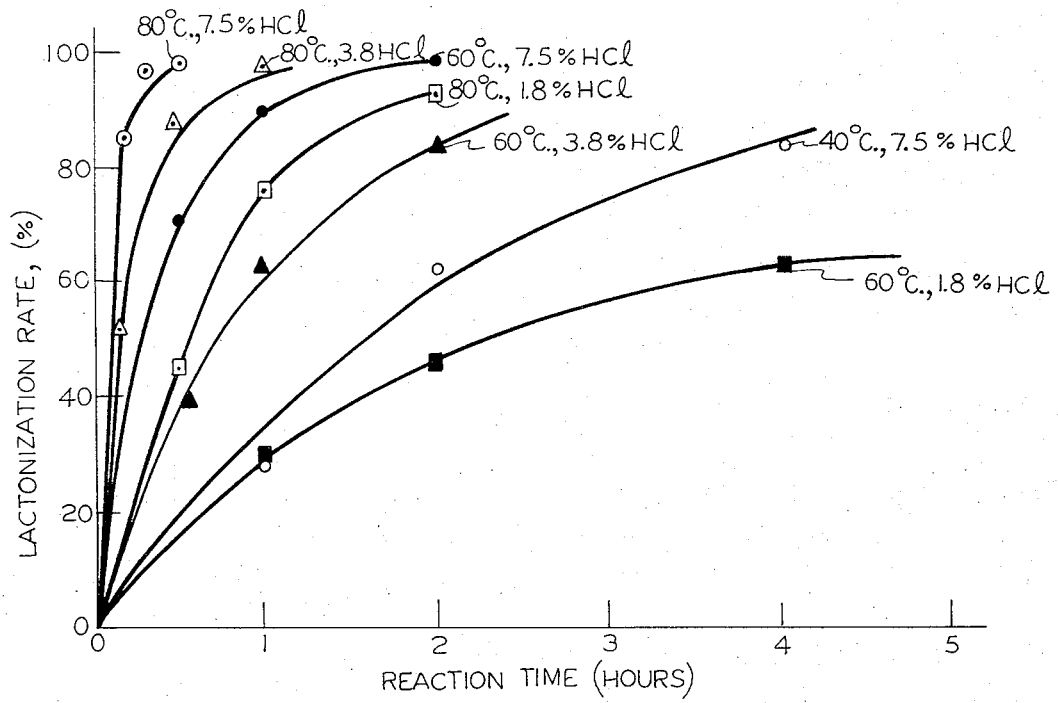

United States Patent [19]
Matsumura et al.

[11] 3,717,603
[45] Feb. 20, 1973

[54] PROCESS FOR PREPARING LACTONIZED ACRYLIC POLYMER SOLUTION

[75] Inventors: Yasuo Matsumura; Kunio Maruyama, both of Okayama, Japan

[73] Assignee: Japan Exlan Company Limited, Osaka, Japan

[22] Filed: Oct. 5, 1970

[21] Appl. No.: 77,992

[30] Foreign Application Priority Data

Oct. 6, 1969  Japan ..................................44/79763

[52] U.S. Cl..........................................260/29.6 AB, 260/29.6 R, 260/29.6 TA, 260/29.6 H, 260/29.6 AT, 260/78.3 U, 260/79.3 MU, 260/79.3 R, 260/80.72, 260/80.76, 260/80.81, 260/85.5 R, 260/85.5 ES, 260/85.5 S
[51] Int. Cl..........................C08f 15/02, C08f 27/14
[58] Field of Search........260/78.3 U, 79.3 MU, 85.5, 260/80.72, 29.6 AB, 29.6 R

[56] References Cited

UNITED STATES PATENTS

| | | | |
|---|---|---|---|
| 3,299,012 | 1/1967 | Kern | 260/78.5 |
| 3,515,706 | 6/1970 | Minato | 260/85.5 |

FOREIGN PATENTS OR APPLICATIONS

| | | | |
|---|---|---|---|
| 989,932 | 4/1965 | Great Britain | 260/79.3 MU |

*Primary Examiner*—James A. Seidleck
*Assistant Examiner*—C. A. Henderson, Jr.
*Attorney*—Wenderoth, Lind & Ponack

[57] ABSTRACT

Process for preparing lactonized acrylic polymer solution by acidifying an aqueous solution of zinc chloride containing dissolved therein an acrylic copolymer of acrylonitrile and a monomer with a hydroxyl group or capable of forming a hydroxyl group, maintaining the acid concentration at 40 percent or less and the pH at 2 or lower.

20 Claims, 2 Drawing Figures

PROCESS FOR PREPARING LACTONIZED ACRYLIC POLYMER SOLUTION

This invention relates to processes for preparing lactonized acrylic polymer solutions and more particularly to a process for obtaining a lactonized acrylic polymer solution very quickly and easily by adding an acid into a zinc chloride aqueous solution in which has been dissolved an acrylic copolymer containing acrylonitrile and a monomer having a hydroxyl group and/or a monomer which is capable of forming a hydroxyl group to keep the acid concentration of the solution 40 percent or less by weight and the pH 2 or less.

We have already disclosed in Japanese Pat. Application No. 21413/1966 that when an acrylic copolymer consisting of acrylonitrile and a monomer having a hydroxyl group or a monomer which is capable of forming a hydroxyl group is treated in a medium containing an acid in a concentration of 40 percent or less and having a pH of 2 or less, there are formed lactone rings in the copolymer.

Such lactonizing reaction can be carried out in either of a uniform system and a nonuniform system. However, particularly, in the case of a nonuniform system, there are such problems (1) that, in order to obtain such shaped articles as fibers and films, the lactonized polymer obtained by the lactonization must be dissolved again in a proper solvent and then shaped into articles, (2) that lactonizing reaction conditions of a high temperature and a long time are necessary to complete the lactonization and (3) that a sufficient washing with water of the lactonized polymer is necessary after the lactonizing reaction. In the case of a uniform system, the lactonized polymer solution resulting from the lactonization can be used directly for shaping into such articles as fibers and films, so that the uniform system is industrially advantageous.

However, it is necessary to carry out the lactonizing reaction under a strong acidity, that is, at a pH of 2 or less. Therefore, for obtaining a lactonized polymer in a uniform system it is necessary to find a solvent which is not adversely affected under said strong acid and in which the lactonizing reaction can proceed well.

We have now found that a uniform lactonizing reaction of an acrylic copolymer containing acrylonitrile and a monomer having a hydroxyl group and/or a monomer which is capable of forming a hydroxyl group can be effected smoothly without adversely affecting the solution if the lactonizing reaction is carried out in an aqueous solution of zinc chloride.

A main object of the present invention is to obtain a lactonized acrylic polymer solution in a uniform system.

Another object of the present invention is to obtain a lactonized acrylic polymer solution which can be directly shaped into articles, by lactonizing an acrylic copolymer containing acrylonitrile and a monomer having a hydroxyl group and/or a monomer which is capable of forming a hydroxyl group in an aqueous solution of zinc chloride in which said copolymer is dissolved.

Another object of the present invention is to obtain a lactonized acrylic polymer by carrying out a lactonizing reaction in an aqueous solution of zinc chloride so that the lactonizing reaction may proceed quickly and smoothly.

Figure 2:
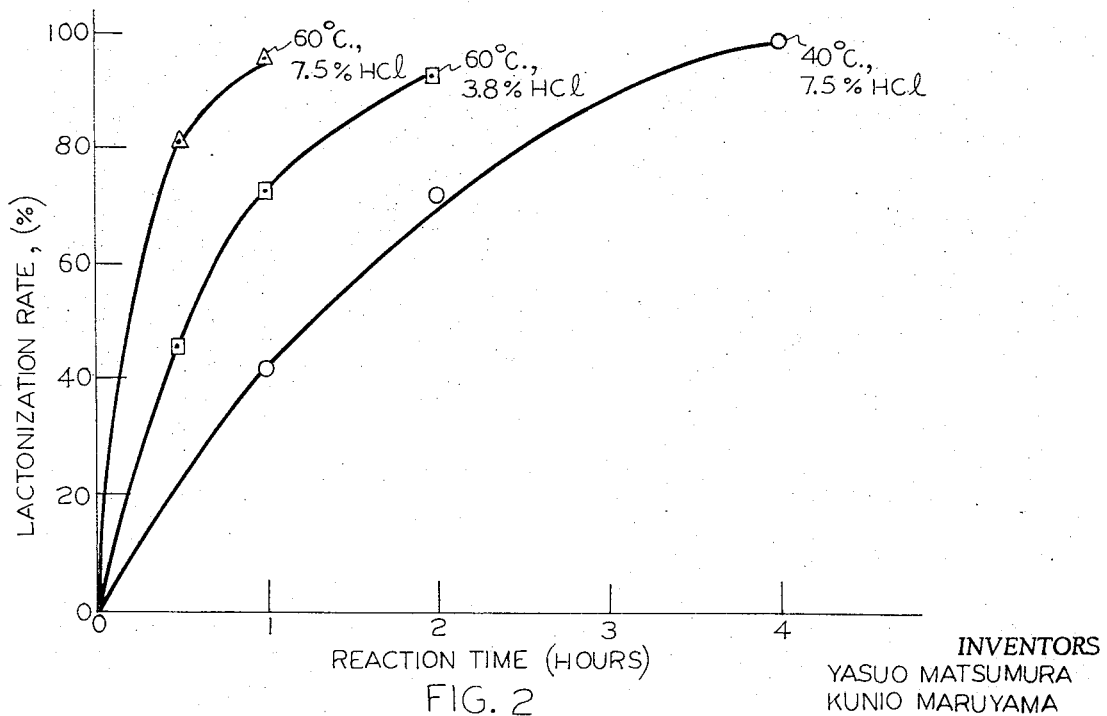

Other objects will become apparent from the following description which will be made by referring partly to the accompanying drawings wherein:

FIG. 1 is a graph showing the relation between the rate of lactonization and reaction time under the conditions of Example 4, and FIG. 2 is a graph similar to FIG. 1 but showing the same relation under the conditions of Example 5.

The above mentioned objects of the present invention are attained by adding an acid into an aqueous solution of zinc chloride into which has been dissolved an acrylic copolymer containing acrylonitrile and a monomer having a hydroxyl group and/or a monomer which is capable of forming a hydroxyl group to keep the acid concentration 40 percent or less by weight and the pH 2 or lower in said aqueous solution.

The aqueous solution of zinc chloride to be used as a solvent for the above mentioned acrylic copolymer and for conducting the lactonization has advantages that it is not affected at all even under a strong acidity of the lactonizing condition, that the uniform lactonizing reaction in the aqueous solution of zinc chloride proceeds much more easily than in any other solvent and that the produced lactonized polymer is not adversely affected. Further, the thus obtained lactonized polymer solution is colorless and transparent and can be shaped directly into fibers and films.

It is known that not only the aqueous solution of zinc chloride but also such inorganic solvents as concentrated aqueous solutions of a thiocyanate and nitric acid and such organic solvents as dimethylformamide and dimethylsulfoxide can dissolve the above mentioned acrylic copolymer. However, when such solvent other than the zinc chloride aqueous solution is used, the lactonizing reaction does not proceed sufficiently, the solvent is adversely affected and the produced lactonized polymer in some cases is also adversely affected. For example, in a uniform lactonizing reaction in an aqueous solution of a thiocyanate, due to the severe lactonizing conditions, the solvent itself is decomposed and denatured and, in the case of using a dimethylformamide or dimethylsulfoxide solvent, the lactonizing reaction is so slow that it is not industrially practical. Further, even in the case of using an aqueous solution of nitric acid, the lactonizing reaction does not proceed sufficiently, heating above 50°C. is required in order to make the lactonizing reaction proceed and the produced lactonized polymer is undesirably modified so much (presumably because the $-CONH_2$ group or the like is introduced into the polymer) that the obtained lactonized polymer solution is undesirably colored.

On the other hand, when a concentrated aqueous solution or zinc chloride is used, even at such low temperature as below 50°C., the lactonizing reaction proceeds so sufficiently and the secondary reaction is so little (thus the undesirable modified structure in the lactonized polymer is so little) that the obtained lactonized polymer solution is colorless and transparent.

The fact that, in the aqueous solution of zinc chloride, even at a low temperature, the lactonizing reaction thus easily proceeds (the lactonizing reaction is accelerated) can be known also from the fact that the activating energy of the lactonizing reaction is 22 kcal./mol when nitric acid is used for the solvent but is as low as 17 kcal./mol in case an aqueous solution of zinc chloride is used for the solvent.

Thus, in the aqueous solution of zinc chloride, the lactonizing reaction is carried out very advantageously. Further, the mechanism of accelerating said reaction is presumed to be because the nitrile group (—CN) in the copolymer forms a complex with the zinc ion ($Zn^{++}$).

The aqueous solution of zinc chloride in which the lactonizing reaction can proceed very easily and advantageously as described above is such concentrated aqueous solution of zinc chloride or a mixed salt with zinc chloride as a predominating component, for example, zinc chloride alone or a mixed salt of zinc chloride with a chloride of an alkali metal or alkaline earth metal such as calcium chloride, magnesium chloride, or sodium chloride which or aluminum chloride is already well known as a solvent for acrylonitrile polymers. It is preferable that at least 50 percent by weight of the mixed salt is zinc chloride. The concentration of zinc chloride or its mixed salt in the aqueous solution may vary depending on the composition of the acrylic copolymer to be dissolved or the kinds of the copolymer components. However, it lower limit is about 30 percent by weight, preferably more than 40 percent by weight and its upper limit is the saturation in water.

According to the present invention, there is added an acid into an aqueous solution of zinc chloride in which is dissolved an acrylic copolymer obtained by copolymerizing acrylonitrile with a monomer having a hydroxyl group and/or a monomer which is capable of forming a hydroxyl group and further, in some case, with another monomer copolymerizable with acrylonitrile but not obstructing the lactonizing reaction, for example, allylsulfonic acid or methallylsulfonic acid or its salt; styrene; such halogen containing monomer as vinyl chloride, vinylidene chloride or vinyl bromide by using a well known polymerizing catalyst. The amount of the acid to be added is such that the acid concentration in the solution is 40 percent by weight or less and the pH is 2 or lower. When there is adopted a severe condition in which the acid concentration exceeds 40 percent by weight, such impure structure as of a carboxylic acid or acid amide is formed in the copolymer. Such impure structure causes undesirable coloring of the copolymer. Further, in order to strictly prevent the formation of such impure structure, it is preferable to carry out the lactonizing reaction under a condition in which the acid concentration is 20 percent by weight or less. The lower limit of the acid concentration is not critical but, when the pH value is higher than 2, the velocity of the lactonizing reaction becomes unduly low.

The acid to be used in the present invention may be either an inorganic or organic acid. However, such acids low in the oxidizing activity as, for example, such inorganic acids as sulfuric acid, hydrochloric acid and phosphoric acid and formic acid, acetic acid, oxalic acid and toluene-sulfonic acid are preferable. Particularly, in case hydrochloric acid is used, the added acid can be converted to a solvent by adding zinc, zinc oxide or calcium oxide at the time of recovering the solvent and therefore it is industrially advantageous.

The degree or rate of the lactonization in the copolymer can be varied by properly selecting the acid concentration, the temperature and time of the reaction. However, particularly, in order to prevent the coloring and denaturing of the produced lactonized polymer solution, it is preferable that the reaction temperature is kept at 20° to 80°C., particularly 30° to 60°C.

The monomer having a hydroxyl group referred to in the present invention is such monomer copolymerizable with acrylonitrile as allyl alcohol or methallyl alcohol. Further, the monomer which can produce a hydroxyl group is such monomer copolymerizable with acrylonitrile and capable of producing a hydroxyl group by being decomposed under the lactonizing conditions as vinyl or allyl compounds of carboxylic acids or ethers and substituted compounds thereof with halogen atoms, hydrocarbon radicals or halohydrocarbon radicals. Preferable compounds are vinyl carboxylates, allyl carboxylates, vinyl hydrocarbyl or halohydrocarbyl ethers and allyl hydrocarbyl or halohydrocarbyl ethers.

Examples of said preferred unsaturated ester of carboxylic acid are vinyl formate, vinyl acetate, vinyl propionate, vinyl butyrate, vinyl caproate, vinyl isocaproate, vinyl caprylate, vinyl pelargonate, vinyl 2-ethyl-hexylcarboxylate, vinyl stearate, vinyl levulinate, ethylvinyl oxalate, vinyl chloroacetate, vinyl dichloroacetate, vinyl benzoate, vinyl cyclohexanecarboxylate, vinyl norbornane-2-carboxylate, allyl acetate, allyl propionate, allyl butyrate, allyl laurate, allyl benzoate, allyl cycloheptanecarboxylate, allyl chloroacetate, 2-chloroallyl acetate, isopropenyl acetate, isopropenyl butyrate, isopropenyl norbornane-2-carboxylate, α-methallyl acetate, β-methallyl acetate, γ-methallyl acetate, methylmethallyl oxalate, γ-methallyl benzoate, and 1-propenyl acetate. Among those compounds, vinyl esters of fatty acids are frequently used. The most preferable compounds are vinyl acetate and vinyl propionate.

Examples of said preferred unsaturated ethers are vinyl methyl ether, isopropenyl methyl ether, β-chlorovinyl methyl ether, β-bromovinyl methyl ether, vinyl ethyl ether, isopropenyl ethyl ether, β-chlorovinyl ethyl ether, β-bromovinyl ethyl ether, vinyl 2-chloroethyl ether, vinyl trifluoroethyl ether, vinyl propyl ether, vinyl isopropyl ether, β-chlorovinyl isopropyl ether, vinyl butyl ether, β-chlorovinyl butyl ether, vinyl isobutyl ether, β-chloro-vinyl isobutyl ether, β-bromovinyl isobutyl ether, vinyl tert-butyl ether, vinyl neopentyl ether, vinyl n-hexyl ether, vinyl 2-ethylhexyl ether, vinyl octyl ether, vinyl cyclohexyl ether, vinyl phenyl ether, α-chlorovinyl phenyl ether, vinyl p-methylphenyl ether, vinyl p-chlorophenyl ether, α-bromovinyl phenyl ether, vinyl 2-chlorophenyl ether, vinyl 2,4-dichlorophenyl ether, vinyl 2,3,4-trichlorophenyl ether, vinyl α-naphthyl ether, vinyl benzyl ether, vinyl p-chlorobenzyl ether, vinyl α,α-dimethylbenzyl ether, allyl methyl ether, allyl ethyl ether, allyl 2-chloroethyl ether, allyl propyl ether, allyl isopropyl ether, allyl butyl ether, allyl isobutyl ether, allyl tert-butyl ether, allyl octyl ether, allyl phenyl ether, allyl p-chlorophenyl ether, allyl 2-chlorophenyl ether, allyl 2,4-dichlorophenyl ether, allyl α-naphthyl ether, allyl benzyl ether, methallyl methyl ether, methallyl ethyl ether, methallyl propyl ether, methallyl isopropyl ether, methallyl butyl ether, methallyl isobutyl ether, methallyl tert-butyl ether and methallyl phenyl ether. Among these compounds, vinyl alkyl ethers and vinyl haloalkyl ethers are frequently used. Most valuable compounds are vinyl methyl ether, vinyl isobutyl ether, vinyl 2-chloroethyl ether and vinyl 3-chloropropyl ether.

Such acrylic copolymer containing a monomer having a hydroxyl group and/or a monomer which can produce a hydroxy group may be prepared by any well known suspension polymerization, emulsion polymerization or solution polymerization.

Further, the proportions of the acrylonitrile, monomer having a hydroxyl group and/or monomer which can produce a hydroxyl group and any other unsaturated monomer to constitute the acrylic copolymer to be used in the present invention may vary depending upon the desired amount of the lactone unit in the produced lactonized polymer or the properties desired for the lactonized copolymer. However, generally, it is preferable that the polymer contains more than 50 mol percent of acrylonitrile. On the other hand, it is possible to use an acrylic copolymer of a composition in which acrylonitrile is less than 50 mol percent and the rest is the monomer having a hydroxyl group and/or monomer which can produce a hydroxyl group and other unsaturated monomer which may be introduced when desired.

Further, so long as no remarkably bad influence is given to the produced lactonized polymer, a part of the acrylonitrile constituting the acrylic copolymer may be replaced with an unsaturated monomer which can produce a carboxyl group such as acrylic acid or methyl acrylate, ethyl acrylate or methyl methacrylate, and the carboxyl group produced by the lactonizing reaction by the process of the present invention can be utilized to form a lactone ring. However, such acrylic copolymer which can be used in the present invention must be of such composition that the copolymer can be dissolved in an aqueous solution of zinc chloride.

The acrylic copolymer is dissolved in an aqueous solution of zinc chloride by any well known method and the lactonizing reaction by the present invention is carried out. Particularly, in case the production (polymerization) of the acrylic copolymer has been conducted in an aqueous solution of zinc chloride, the resulting polymer solution (zinc chloride aqueous solution in which the copolymer is already dissolved) can be subjected immediately to the lactonizing reaction by the present invention.

However, when the lactonizing reaction is carried out simultaneously with the solution polymerization using the above mentioned aqueous solution of zinc chloride, the monomers are decomposed under the strong acidity to produce aldehydes which have remarkably bad influences on the polymerizing reaction, and the lactonized polymer is not obtained advantageously so that such method is not desirable. Further, in the solution polymerization using the above mentioned aqueous solution of zinc chloride, in order to carry out the polymerizing reaction smoothly, generally a value of the polymerization pH of about 2 is adopted. However, when the solution polymerization is to be carried out with a polymerization pH of less than 2 in order to obtain the polymer solution suitable for the lactonizing reaction according to the present invention, it is necessary to prevent the decomposition of the monomers as much as possible by completing the polymerizing reaction within a time as short as possible at a low temperature.

The concentration of the acrylic copolymer in the aqueous solution of zinc chloride is not critical so long as the above mentioned aqueous solution of zinc chloride containing said copolymer is present in the state of a uniform solution but it is preferable to carry out the lactonizing reaction at a polymer concentration of about 1–30 percent by weight, particularly 3–20 percent by weight.

Further, so long as no remarkably bad influence is given to the lactonizing reaction, any other additive in the form of a solution or solid may well be added into the aqueous polymer solution.

The resulting lactonized polymer solution can be immediately shaped into articles. Generally, the solution may be shaped into fibers or films by a well known wet spinning or wet film making process. The shaped articles are improved in physical and chemical properties such as Young's modulus, strength and elongatability in hot water. Further, these articles are remarkable in flame-resistance and the generation of toxic gases is small.

The below mentioned examples illustrate the present invention but do not limit the scope of the invention. In these examples, the percentages and parts are by weight unless otherwise specified.

EXAMPLE 1

Eight parts of an acrylic copolymer consisting of 80 percent acrylonitrile and 20 percent vinyl acetate were dissolved in 92 parts of a mixed solution of 80 parts of an aqueous solution consisting of 35 percent zinc chloride, 20 percent calcium chloride and 45 percent water and 20 parts of a 35 percent aqueous solution of hydrochloric acid. The polymer solution was lactonized in a uniform system at 60°C. for 1 hour while stirring.

The thus obtained lactonized polymer solution was deaerated under a reduced pressure to obtain a spinning solution of a viscosity of 3,600 centipoises (as measured at 30°C.). The spinning solution was extruded through a spinnerette of 50 orifices (each 0.09 mm. in diameter) into a coagulating bath of a 15 percent aqueous solution of zinc chloride at 0°C. to form coagulated filaments. Then the filaments were stretched twice the original length in said coagulating bath, washed with water and then further stretched five times the length in boiling water. Then the filaments were dried in a heated atmosphere at a relative humidity of 60 percent and a temperature of 105°C. and were then heat-treated with superheated steam at 125°C. to obtain fibers. The strength of the fiber was 3.5 g./denier and its elongation was 25 percent.

Apart from the above, a part of the lactonized polymer solution was taken and the polymer was precipitated and recovered for measuring the lactone unit content in the polymer. It was found that a lactone unit amount of 19 percent was contained in said lactonized polymer.

The lactone unit amount was represented by the percentage by weight in the polymer of a group (lactone unit) of

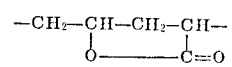

and was measured from an infrared absorption band of 1,176 cm$^{-1}$ in the copolymer obtained by using as a criterion a copolymer of a known lactone unit amount made from a copolymer of methyl acrylate and vinyl acetate by the method mentioned on pages 142 to 154 of "Chemistry of High Polymers" ("Kobunshi Kagaku" in Japanese) Vol. 7 (1950).

EXAMPLE 2

Five parts of a copolymer consisting of 76 percent acrylonitrile, 16 percent vinyl acetate and 8 percent vinylidene chloride were dissolved in 95 parts each of the mixed solutions (solvent + acid) whose compositions are shown in Table 1 and a uniform system lactonizing reaction was conducted under various conditions. After the reaction, the polymer was reprecipitated from the produced solution and the lactone unit amount contained in said polymer, the lactonization rate and the denaturing absorption (the absorption strength of the infrared absorption band of 1,680 cm$^{-1}$) of said polymer were measured and are shown in Table 1.

The the lactonization rate is the rate (degree) of the conversion to the lactone unit of the monomer having a hydroxyl group and/or the monomer capable of producing a hydroxyl group contained in the polymer.

As apparent from Table 1, in the case of the present invention in which a zinc chloride series aqueous solution is used as the solvent, a colorless highly lactonized polymer solution having only a very slight denatured structure is obtained, whereas, in case nitric acid is used as the solvent, the denaturing absorption is so large, that is, the denatured structure is so much that a remarkably colored polymer solution is obtained and the rate of lactonization is not sufficient.

Further, in case such organic solvent as dimethylformamide or dimethylsulfoxide was used, the lactonizing reaction proceeded only slightly.

TABLE 1

| Solvents | Acids | Solvent acid mixing ratio | Reaction temp °C. | Reaction time min. | Lactone unit amount % | Lactonization rate % | Denaturing* absorption |
|---|---|---|---|---|---|---|---|
| 65% ZnCl$_2$ | 35% HCl | 80/20 | 80 | 30 | 16.0 | 83 | 0.10 |
| " | 62% HNO$_3$ | " | " | " | 15.5 | 81 | 0.16 |
| " | PTS | 90/10 | " | 60 | 17.6 | 91 | 0.08 |
| 62% HNO$_3$ | — | — | " | 10 | 7.8 | 42 | 0.39 |
| " | — | — | " | 20 | 13.8 | 72 | more than 1 |
| " | — | — | " | 30 | 12.3 | 65 | " |
| " | H$_2$SO$_4$ | 80/20 | " | 10 | 7.2 | 39 | 0.65 |
| " | " | " | " | 20 | 8.7 | 47 | more than 1 |
| " | " | " | " | 30 | 10.0 | 53 | " |
| DMSO | 62% HNO$_3$ | 80/20 | " | 60 | Less than 1 | 23 | — |
| DMSO | PTS | 90/10 | " | " | " | — | — |
| DMF | 62% HNO$_3$ | 80/20 | " | " | " | — | — |
| DMF | PTS | 90/10 | " | " | " | — | — |

DMSO: Dimethylsulfoxide.
DMF: Dimethylformamide.
PTS: Para-toluenesulfonic acid.
*: Absorption strength per 3 mg. of the produced lactonized polymer at 1680 cm$^{-1}$.

EXAMPLE 3

Phosphoric acid was added to an acrylic copolymer (of a composition of acrylonitrile/vinyl acetate/vinylidene chloride = 66/18/16) solution (of a copolymer concentration of 8 percent obtained by a solution polymerization using 65 percent aqueous solution of zinc chloride to make the acid concentration in said solution 15.6 percent. Then a uniform lactonizing reaction was carried out at 60°C. for 1 hour while the solution was being stirred to obtain a lactonized polymer of a lactone unit amount of 8.1 percent.

Further, in case perchloric acid was used in place of the phosphoric acid (the amount of the acid present in the lactonizing reaction system was 5.5 percent, there was obtained a lactonized polymer solution containing a lactone unit amount of 8.5 percent.

EXAMPLE 4

Hydrochloric acid was added at various rates to an aqueous solution of 65 percent zinc chloride of an acrylic copolymer consisting of 66 percent acrylonitrile, 18 percent vinyl acetate and 16 percent vinylidene chloride (of a copolymer concentration of 8 percent) to prepare various polymer solutions of acid concentrations in said solutions of respectively 1.8, 3.8 and 7.5 percent and uniform system lactonizing reactions were made at 40°, 60° and 80°C. to obtain favorable lactonized polymer solutions.

The relations between the reaction time and lactonization rate in the above described various lactonizing reactions are shown in FIG. 1.

EXAMPLE 5

Eight parts of an acrylic copolymer consisting of 60 percent acrylonitrile, 15 percent vinyl acetate and 25 percent vinylidene chloride were dissolved in 92 parts of a solution prepared by mixing a mixed solution (solvent) of 40 percent zinc chloride, 20 percent calcium chloride and 40 percent water with 35 percent hydrochloric acid at a ratio of 80/20 or 90/10 and a uniform system lactonizing reaction was carried out at 40° or 60°C. to obtain a lactonized polymer solution which was very little colored.

The the acid concentration in the lactonizaing reaction system became 7.5 percent in the case of a mixing ratio of the solvent/hydrochloric acid of 80/20 and become 3.8 percent in the case of a mixing ratio of 90/10.

The relations between the reaction time and lactonization rate in such various lactonizing reactions are shown in FIG. 2.

EXAMPLE 6

Eight parts of the acrylic copolymer used in Example 5 were dissolved in a mixed solution of 65 percent zinc chloride aqueous solution/35 % hydrochloric acid = 80/20 or a mixed solution of an aqueous solution consisting of 40 percent zinc chloride, 20 percent calcium chloride and 40 percent water/35 percent hydrochloric acid = 80/20 and the solution was lactonized in a uniform system at 40°C. for 4 hours to obtain respectively a lactonized polymer (polymer A) of a lactone unit amount of 15 percent or a lactonized polymer (polymer B) of a lactone unit amount of 17.5 percent.

Further, when eight parts of the above mentioned acrylic copolymer were dissolved in 92 parts of 62 percent nitric acid and a uniform system lactonizing reaction was made under the same conditions as are mentioned above, there was obtained a lactonized polymer (polymer C) containing a lactone unit amount of 11 percent.

When the thus obtained three kinds of lactonized polymers were compared, the polymer B was a very useful white polymer which was least denatured and highest in the contents of the lactone unit and next the the polymer A showed favorable properties.

The polymer C was remarkably denatured and colored and showed undesirable properties.

EXAMPLE 7

Ten parts of an acrylic copolymer consisting of 85 percent acrylonitrile and 15 percent allyl alcohol were dissolved in 90 parts of a mixture of a solution consisting of 40 percent zinc chloride, 20 percent calcium chloride and 40% water/35 % hydrochloric acid = 90/10 and then the solution was lactonized in a uniform system at 60°C. for 2 hours while being stirred. The produced polymer was taken out of the obtained solution by reprecipitation and the infrared absorption spectrum of said polymer was measured. As a result, the absorption of a hydroxyl group of 3,450 cm$^{-1}$. decreased, an absorption of C = 0 and C—O—C showing the absorption of a six-member ring lactone was recognized at 1,735 cm$^{-1}$. and 1,165 cm$^{-1}$. and a white lactonized acrylic polymer was obtained. When the lactone unit amount in said obtained lactonized polymer was determined by the amount of decrease (the hydroxyl group of the allyl alcohol is consumed by the lactone ring formation) of the allyl alcohol in the polymer by the lactonizing treatment, it was found that 17 percent of a six-member ring lactone unit was contained.

What we claim is:

1. A process for preparing a lactonized acrylic polymer solution which comprises adding an acid to an aqueous solution of zinc chloride, containing at least 30 percent by weight of zinc chloride or a mixture of zinc chloride and an alkali metal chloride, an alkaline earth metal chloride or aluminum chloride with zinc chloride as the main component, in which is dissolved an acrylic copolymer prepared from acrylonitrile and at least one of a monomer having a hydroxyl group and a monomer capable of forming a hydroxyl group, the acid concentration in the the aqueous solution being maintained at 40 percent by weight or less and the pH of the aqueous solution at 2 or lower during lactonization.

2. A process as claimed in claim 1 wherein the copolymer contains at least 50 mol percent of acrylonitrile.

3. A process as claimed in claim 1 wherein the monomer having a hydroxyl group is selected from allyl alcohol and methallyl alcohol.

4. A process as claimed in claim 1 wherein the monomer capable of forming a hydroxyl group is selected from the group consisting of vinyl and allyl compounds of carboxylic acids and ethers and substituted compounds thereof with halogen atoms, hydrocarbon radicals and halohydrocarbon radicals.

5. A process as claimed in claim 1 wherein the monomer capable of a forming a hydroxyl group is a vinyl ester of fatty acid.

6. A process as claimed in claim 5 wherein said vinyl ester is vinyl acetate or vinyl propionate.

7. A process as claimed in claim 1 wherein the acid content is not higher than 20 percent.

8. A process as claimed in claim 1 wherein the acid is selected from sulfuric acid, hydrochloric acid, phosphoric acid, formic acid, oxalic acid and toluenesulfonic acid.

9. A process as claimed in claim 1 wherein the concentration of the acrylic copolymer in the aqueous solution of zinc chloride is about 1–30 percent by weight.

10. A process as claimed in claim 9 wherein said concentration of the acrylic polymer is 3–20 percent by weight.

11. A process as claimed in claim 1 wherein the concentration of said zinc chloride or mixed salt is at least 40 percent by weight in the aqueous solution of zinc chloride.

12. A process as claimed in claim 1 wherein the upper limit of the concentration of said zinc chloride or mixed salt in the aqueous solution of zinc chloride is the saturation point of the salt in water.

13. A process as claimed in claim 1 wherein said mixed salt consists of zinc chloride and calcium chloride.

14. A process as claimed in claim 1 wherein the temperature of the lactonizing reaction is 20° to 80°C.

15. A process as claimed in claim 1 wherein the copolymer consists of (1) at least 50 mol percent of acrylonitrile, (2) at least one of a monomer having a hydroxyl group and a monomer which can produce a hydroxyl group and (3) at least one monomer selected from the group consisting of allyl sulfonic acid, methallyl-sulfonic acid and their salts, styrene, vinyl chloride, vinyl bromide and vinylidene chloride.

16. A process as claimed in claim 1 wherein the copolymer consists of acrylonitrile vinyl acetate and vinylidene chloride.

17. A process as claimed in claim 14 wherein the temperature is 30° to 60°C.

18. A process as claimed in claim 1 wherein the acrylic copolymer is prepared by solution polymerization in the aqueous solution of zinc chloride.

19. A lactonized acrylic polymer solution having a pH of 2 or lower and comprising an acrylic copolymer prepared from acrylonitrile and at least one of a monomer having a hydroxyl group and a monomer capable of forming a hydroxyl group, water, at least 30 percent by weight, based on the weight of the water, of zinc chloride or a mixture of zinc chloride and an alkali metal chloride, an alkaline earth metal chloride or aluminum chloride with zinc chloride as the main component, and 40 percent or less by weight of acid.

20. A solution according to claim 19 wherein the acid is sulfuric, hydrochloric, phosphoric, formic, oxalic or toluene-sulfonic acid.

* * * * *